United States Patent [19]
Wick et al.

[11] 4,230,400
[45] Oct. 28, 1980

[54] PHOTOGRAPHIC CAMERA WITH EXPOSURE-CONTROL AND FOCUSSING MEANS

[75] Inventors: Richard Wick; Otto Stemme, both of Munich; Peter Lermann, Feldkirchen; Karl Wagner, Munich; Kurt Borowski, Aschheim; Istvan Cocron, Munich; Günter Fauth, Unterhaching, all of Fed. Rep. of Germany

[73] Assignee: AGFA-Gevaert, A.G., Leverkusen, Fed. Rep. of Germany

[21] Appl. No.: 964,736

[22] Filed: Nov. 29, 1978

[30] Foreign Application Priority Data

Nov. 26, 1977 [DE] Fed. Rep. of Germany ....... 2752929

[51] Int. Cl.³ ............ G03B 7/081; G03B 7/099; G03B 13/18
[52] U.S. Cl. .................. 354/25; 354/31; 354/50; 354/59; 354/60 L
[58] Field of Search .......... 354/25, 31, 50, 51, 354/59; 352/14 D

[56] References Cited

U.S. PATENT DOCUMENTS

| | | | |
|---|---|---|---|
| 3,999,192 | 12/1976 | Hosoe et al. | 354/25 |
| 4,047,187 | 9/1977 | Mashimo | 354/25 X |

FOREIGN PATENT DOCUMENTS 2705104  8/1978  Fed. Rep. of Germany ............. 354/25

Primary Examiner—Michael L. Gellner
Attorney, Agent, or Firm—Michael J. Striker

[57] ABSTRACT

A focussing system emits an infrared light beam towards the subject, the reflected beam passing through an infrared filter and being projected by a spot optics as a small spot onto a pair of photosensitive elements. The spot optics shifts in a plane normal to the camera's optical axis in dependence upon rotation of the camera's focussing ring, to vary the distribution of the reflected beam onto the two elements, the distribution being equal between them when the state of focus is correct. A circuit derives, from the output signals of the two photosensitive elements, a state-of-focus signal used to automatically focus or else to indicate to the user the direction in which he should manually adjust focus. When focussing is finished, the photosensitive elements are disconnected from the focussing circuitry and connected to the camera's exposure-control circuitry, to thereby serve a dual function. The infrared filter moves out of the light path of the photosensitive elements. The spot optics is moved out of the light path of the photosensitive elements, so that for exposure control a larger light field can be established, or else an auxiliary optics moves into the light path to enlarge the light field in that manner.

17 Claims, 4 Drawing Figures

PHOTOGRAPHIC CAMERA WITH EXPOSURE-CONTROL AND FOCUSSING MEANS

BACKGROUND OF THE INVENTION

The present invention relates to photographic cameras of the type provided with an electronic exposure control system including a photosensitive light-measuring stage and a shutter-control electromagnet, and provided also with a focussing system for automatically adjusting the setting of the objective in dependence upon automatically measured subject distance or, alternatively, merely indicating to the user the direction in which he should move a manual focus adjuster for the same purpose.

SUMMARY OF THE INVENTION

It is the general object of the present invention to provide a photographic camera of the type in question, in which components can be shared by both the exposure-control system of the camera, on the one hand, and the automatic or semiautomatic focussing system of the camera, on the other hand, so that the focussing and exposure-control systems of the camera be as consolidated, spatially compact and simple as possible.

In the presently preferred embodiments of the invention, this is achieved as follows: A signal source furnishes a measuring beam which is projected towards, and reflected back from, the subject to be photographed. The frequency spectrum of the measuring beam is located within the frequency spectrum to which the photosensitive means of the camera's exposure-control system can respond, and the photosensitive means of the exposure-control system is in fact additionally used to detect the reflected measuring beam, i.e., in addition to their exposure-control function.

The photosensitive means in question comprises at least one pair of photosensitive elements. During automatic or semiautomatic focussing, the two photosensitive elements form part of a subtracting system operative for producing a correct-focus signal when the light-dependent signals produced by the individual ones of the two photosensitive elements are equal.

During focussing, there is located in front of the pair(s) of photosensitive elements of the exposure-control system a spot optics operative for projecting onto the photosensitive-element pair a small spot of light. The spot-optics is shiftable, in a direction transverse to the optical axis (i.e., not parallel thereto) relative to the photosensitive-element pair; alternatively, the photosensitive-element pair is thusly shiftable relative to the spot optics.

During exposure control, as opposed to automatic or semiautomatic focussing, the action of the spot optics is discontinued, so that the light spot action afforded by the latter will not interfere with normal automatic exposure control. For example, the spot optics can simply be moved out of the light path.

Advantageously, one and the same arrangement of photosensitive elements is used both for automatic or semiautomatic focussing and for automatic exposure control. Accordingly, only a single light-admitting opening need be provided in the camera housing for admitting light onto the light-measuring means of both systems.

Also, the photosensitive response of the photosensitive elements used for exposure control is the same as that of the photosensitive elements used for focussing, i.e., precisely because the selfsame photosensitive elements are used for both purposes. Accordingly, there is greater freedom in exploiting the possibility of sharing other circuit components and stages as between the exposure-control and focussing systems of the camera. This in turn can lead to further simplification and consolidation of the circuitry of the two systems, especially when integrated circuitry is being employed.

Advantageously, the entrance or aperture angle of the light is varied by corresponding optical means. For example, the light spot derived from the measuring beam and projected onto the photosensitive-element pair(s) during focussing operations can be of small size, but thereafter followed by a switchover to full-field projection of the incoming image light onto the element pair(s).

In order to minimize the effect of incoming exposure or image light during focussing operations, use is advantageously made of a filter arrangement having an optical bandpass frequency range located within the range of frequencies to which the photosensitive-element pair(s) can respond. When the source emitting the measuring beam operates at constant radiant intensity, then it is advantageous that the frequency range of the filter arrangement be located outside the frequency range of visible light. Alternatively, use could be made of a measuring-beam source producing a modulated measuring beam, in that sense distinguishable from incoming image light, in which case the frequency range of the measuring beam could be within the visible part of the spectrum. In that event, instead of an optical filter arrangement, use could be made of an electrical filter responding to the correspondingly modulated component within the signal produced by the photosensitive-element pair(s).

According to a further concept of the invention, the two photosensitive elements are alternatively connectable, by means of changeover switches, to either the inputs of a difference amplifier forming part of the focussing system or else to the input stage of the exposure-control circuitry of the camera, and the settings of the changeover switches change when an exposure is about to be performed. The changeover switches can be coupled directly to the camera release button, so that the changeover from automatic or semiautomatic focussing operation to exposure-duration control occurs as the user commences to depress the release button. Alternatively, the changeover switches can be coupled to and responsive to the opening movement performed by the aperture-unblocking member(s) of the camera's shutter mechanism. Or else, the changeover switches can be coupled to mechanical components intermediate the release button and the aperture-unblocking member(s), i.e., so that the change of operating mode sets in as the exposure is about to be performed.

In a preferred embodiment of the invention, the mechanical component activating the changeover switches also serves as the mechanical carrier for the aforementioned optical filter arrangement, and these form a single structural unit with aforementioned spot optics, i.e., a structural unit which can be inserted into the camera housing as a whole during assembly, or removed therefrom for inspection or repair.

According to a further concept of the invention, the aforementioned mechanical carrier furthermore carries a further optical unit which, for actual exposures, moves into the path of the photosensitive elements and projects onto them (or onto just one of them) the entire incoming image field, i.e., in contrast to the smaller measuring-beam spot used during focussing. According to a further concept, the last-mentioned optical unit can cooperate with a light-attenuating or -correcting stage serving to modify the spectral content of the incoming image light in a sense compensating for the different spectral responses of the photosensitive elements, on the one hand, and photographic film, on the other hand.

The mechanical carrier for the optical filter arrangement and for the further optics referred to above can actually be a part of the aperture-unblocking structure of the camera's shutter mechanism.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
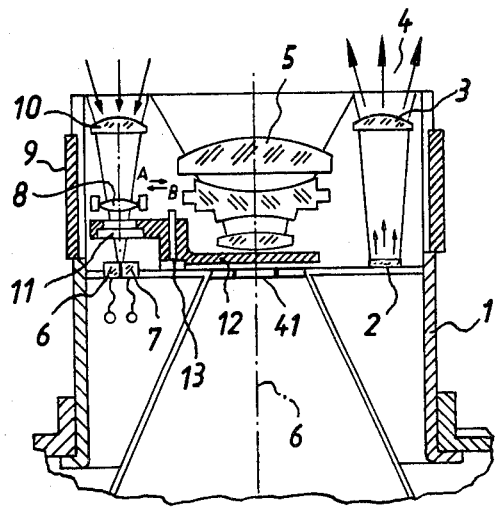
FIGS. 1–3 depict a first exemplary embodiment of the invention.

In FIG. 1, numeral 1 denotes the lens tube of a photographic camera. Located within lens tube 1 is an infrared emitter 2, in front of which is arranged a collector lens 3 operative for forming a measuring beam 4. Numeral 5 denotes the actual exposure objective of the camera. A differential light detector arrangement, here comprised of two adjoining silicon photodiodes 6 and 7, is located symmetrically to the infrared emitter 2 and collector lens 3, i.e., relative to the camera's optical axis 6. Numeral 8 denotes a collector lens located in front of the two silicon photodiodes 6, 7 and mounted (by non-illustrated means) for shifting motion in the direction of arrows A and B, in dependence upon the user turning the camera's manual focussing ring 9. Numeral 10 denotes a further collector lens located in front of lens 8. Collector lens 10 transmits both the infrared measuring beam 4, i.e., as reflected back to the camera from the subject to be photographed, and also the incoming image light per se, e.g., the daylight reflected to the camera from the subject to be photographed.

An infrared optical filter 11 is mounted on a carrier member 12 swingable about a swing axis 13 into and out of the space intermediate the collector lens 8 and the two photodiodes 6, 7.

The shiftably mounted collector lens 8 projects a small spot onto the two photodiodes 6, 7 equally when the camera is properly focussed. If the user turns the adjuster ring 9 in a first direction, so as to defocus the camera in a first sense, the collector lens 8 is shifted (by means of the non-illustrated mechanical coupling) in the direction of arrow A, so that now a greater part of the light spot falls on a first of the two photodiodes. Likewise, if the user turns the adjuster ring 9 in the other direction to defocus the camera in the opposite sense, the greater part of the light spot falls onto the other of the two photodiodes.

Figure 2:
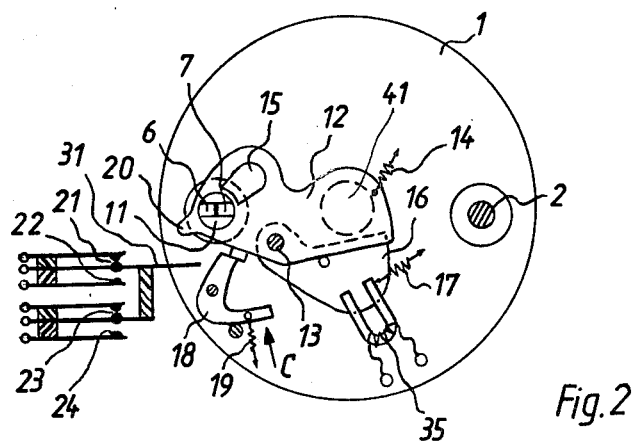

As shown in FIG. 2, the carrier member 12 for the infrared filter 11 can actually be the aperture-unblocking member of the camera's shutter mechanism. Aperture-unblocking member 12 is urged by a spring 14 in the aperture-unblocking direction. Member 12 is furthermore provided with an opening 15 so located that, as the aperture-unblocking member 12 moves from its aperture-blocking to its aperture-unblocking position, opening aperture 15 moves into position in front of the two silicon photodiodes 6, 7, for the exposure-control mode of operation.

During exposure-control operation, it is preferable that the light-spot action of lens 8 be discontinued, i.e., so that the entirety of the incoming image-light field can fall upon the differential photodetector arrangement 6, 7. To this end, the shiftable collector lens 8 can, during actual exposure, be swung (by non-illustrated) means out of the light path of photodiodes 6, 7. Alternatively, inasmuch as collector lens 8 is already mechanically coupled to the objective for focussing ring 9, it may be desired to keep its mounting structure simple, by not additionally mounting lens 8 for swinging movement into and out of the photodiode light path; in that event an auxiliary lens can be mounted in aperture 15 and be operative for compensating the small relative aperture of collector lens 8, i.e., so as to restore the relative aperture of the light incident upon the photodetector arrangement 6, 7 to full-field conditions for incoming image light.

Numeral 16 denotes the aperture-reblocking member of the camera's shutter mechanism. Member 16 is urged by a spring 17 in the aperture-reblocking direction. A trigger latch 18, normally urged by a spring 19 in latching direction, prevents aperture-unblocking member 12 from leaving the aperture-blocking position thereof but, when moved in the direction of arrow C in response to release button depression, unlatches member 12 so that the latter can move to aperture-unblocking position. Member 12 is provided with a switch-actuating projection 20 capable of changing the setting of the two, inter-coupled movable contacts of two changeover switches, each of which latter comprises two respective stationary contacts 21, 22 or 23, 24.

Figure 3:
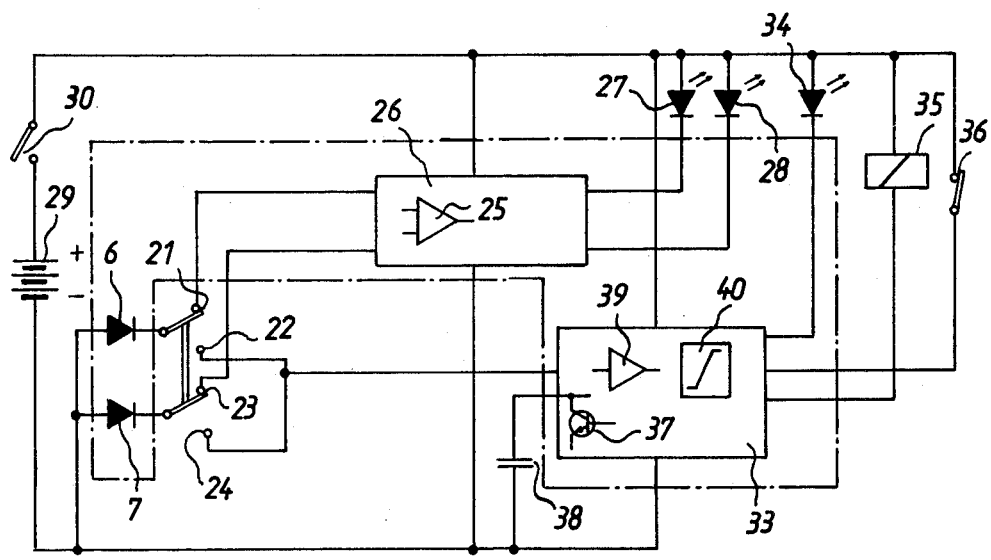

FIG. 3 is a simplified block diagram illustrating how components of both the camera's focussing system and its exposure-control system are connected to the silicon photodiodes 6, 7. With the two changeover switches 21, 22 and 23, 24 in the illustrated settings, the two photodiodes 6, 7 are connected to respective ones of the two inputs of a circuit stage 26 containing a comparator 25. Two light-emitting diodes 27, 28 are connected to respective ones of the two outputs of circuit stage 26. The comparator 25 within stage 26 produces a signal dependent upon the magnitude and polarity of the difference between the two input signals from photodiodes 6, 7, but circuit stage 26 contains additional (per se conventional) circuitry operative for ascertaining the polarity of the difference per se and, in dependence thereon, producing an output signal at one or the other of the two outputs of circuit stage 26. During semiautomatic focussing operations, if the small light spot projected by shiftable lens 8 falls more on photodiode 6 than on photodiode 7, LED 27 lignts up, to indicate to the user that he should turn focussing ring 9 in a first direction; if the light spot falls more on photodiode 7, LED 28 lights up, telling the user to turn adjuster ring 9 in the opposite direction. If the light spot falls on photodiodes 6 and 7 equally, neither of the two LED's 27, 28 lights up, this informing the user that the state of focus is correct.

Preferably, the LED's 27, 28 are so located as to be viewable in the camera's viewfinder; and here, with the manual focus adjuster being a turnable ring 9, the LED's are preferably shaped as curved arrows, one of which points counterclockwise and the other clockwise, for a readily interpreted instruction concerning the direction in which ring 9 should be turned.

The circuitry shown in FIG. 3 is energized from a camera battery 29 and connectable thereto by a power-connect switch 30 which closes either as the user just begins to depress the release button or, for example, when the user operates the film-transport lever of the camera.

When the release button is depressed and trigger latch 18 moves in the direction of arrow C, aperture-unblocking member 12 moves to its aperture-unblocking or unset position. The switch-actuating projection 20 thereon causes the changeover switches 21, 22 and 23, 24 to change from the settings shown in FIG. 3 to their other settings, thereby disconnecting photodiodes 6, 7 from the two inputs of the semiautomatic focussing circuit 26 and instead connecting them in common to the input of the camera's exposure-control circuitry 33.

Exposure-control circuit 33 is built up of known exposure-control circuit stages and components, universally familiar in this art, and therefore not requiring detailed description. One output of exposure-control circuit 33 is connected to an LED 34 which lights up when prevailing scene-light level is insufficient for the making of an acceptable exposure. Another output of exposure-control circuit 33 is connected to a shutter-control electromagnet 35. As shown in FIG. 1, aperture-reblocking member 16 is provided with a small pin bearing against the lower edge of aperture-unblocking member 12, so that the latter prevents the former from moving to aperture-reblocking position, until such time as member 12 leaves aperture-blocking position. However, before member 12 leaves aperture-blocking position, e.g., when the user just begins to depress the camera release button, the power-connect switch 30 of FIG. 3 closes, energizing electromagnet 35, and the latter holds aperture-reblocking member 16 in the aperture-unblocking position. When the exposure is to be terminated, exposure-control circuit 33 deenergizes electromagnet 35, so that spring 17 can pull aperture-reblocking member 16 into aperture-reblocking position.

A mode-changeover switch 36 is connected to a mode-control input of exposure-control circuit 33 and is, for example, actuated by aperture-unblocking member 12 as the latter leaves the aperture-blocking position at the start of an exposure, to thereby convert circuit 33 from its light-sufficiency indicating mode of operation to its exposure-timing mode of operation. Exposure-control circuit 33 is provided with a light-integrating capacitor 38 and also with a transistor-type short-circuiting switch operative for initiating an exposure-timing operation by ceasing to short-circuit the light-integrating capacitor 38. Circuit 33 also comprises an amplifier 39 for amplifying the light-dependent signal coming from the two photodiodes 6, 7; for example if this amplifier is an operational amplifier, the two light-dependent signals coming from the two photodiodes will be simply summed at the input of amplifier 39. Also, exposure-control circuit 33 comprises a threshold circuit 40 operative, in the light-sufficiency indicating mode, for ascertaining whether the sensed scene-light level is or is not sufficient for an acceptable exposure and operative, in the exposure-timing mode, for ascertaining whether the total (integrated) amount of incident light has or has not reached the value needed for a correct exposure.

For example, if the changeover switches 21, 22 and 23, 24 are coupled directly to the camera release button, and not to the shutter mechanism's unblocking member 12, then if the user depresses the release button only a little, switches 21, 22 and 23, 24 convert to their nonillustrated settings, converting the circuit of FIG. 3 from focussing operation to light-sufficiency evaluation. If the prevailing scene-light level is too low, LED 34 lights up, and the user does not depress the release button all the way down. Otherwise, when the user depresses the release button all the way down, this triggers the shutter mechanism, and aperture-unblocking member 12, as it leaves the aperture-blocking position thereof, opens switch 36 and thereby converts circuit 33 to exposure-timing operation, i.e., with capacitor 38 becoming connected into circuit and ceasing to be short-circuited by transistor 37.

As the aperture-unblocking member 12 leaves the aperture-blocking position thereof at the start of the exposure, the infrared filter 11 carried by member 12 swings out of the light path of photodiodes 6, 7, so that the latter can now receive the visible light reflected from the subject to be photographed. Of course, the photodiodes 6, 7 should have a spectral response matched to that of the film or human vision. If necessary, aperture 15 in aperture-unblocking member 12 can accommodate a suitable corrective filter, or the like, for correcting the spectral response of the photodiodes 6, 7.

Instead of using an infrared filter 11 to distinguish between the measuring beam 4 and mere image light, the measuring beam 4 could alternatively be modulated, with the output signals from photodiodes 6, 7 passed through a filter arrangement responsive to the modulating frequency, to suppress the effect of mere image light in that manner.

Preferably, circuit stages 26 and 33 form parts of a single integrated circuit, to which the changeover switches, LED's integrating capacitor, and shutter-control magnet are connected on. Advantageously, the two silicon photodiodes 6, 7 are provided on the same integrated-circuit carrier or substrate.

Figure 4:
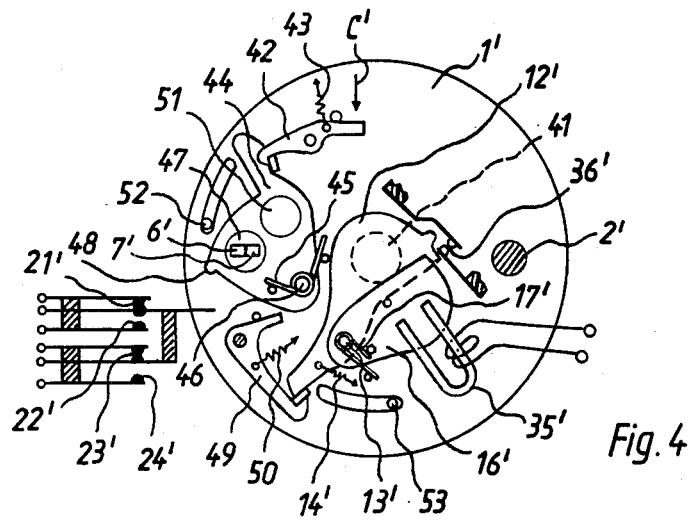
FIG. 4 depicts the modified part of a second exemplary embodiment of the invention.

FIG. 4 depicts the modified part of second exemplary embodiment. Components corresponding to those of the first embodiment are denoted by the same reference numerals as there, but primed.

The aperture-unblocking and -reblocking members 12', 16' are swingable about a common swing axis 13'. Numeral 41 denotes the aperture of the camera's exposure objective. A trigger latch 42 is urged by a spring 43 towards latching position, but can be moved in the direction of arrow C' into an unlatching position. Latch 42 when in latching position prevents a carrier member 44 from being swung about a swing axis 46 by a biasing spring 45. With carrier member 44 in its illustrated position, an infrared filter 47 carried thereon is located in front of the two silicon photodiodes 6', 7'. The changeover switches 21', 22' and 23', 24', already described, are here activated by a switch-actuating projection 48 on carrier member 44. The latch 49 for the shutter mechanism per se, biased by a spring 50 towards latching position, is displaced to unlatching position when spring 45 moves carrier member 44 out of the illustrated position thereof.

Also, carrier member 44 is provided with an aperture 51, having the same purpose as aperture 15 in FIG. 2 and accommodating, if necessary, a corrective filter unit for correcting the spectral response of the photodiodes 6', 7'. Pins 52, 53 are part of (otherwise unillustrated) means operative after an exposure for returning the carrier member 44 and shutter blades 12', 16' to the positions depicted in FIG. 4.

In a manner very similar to that described with respect to FIG. 3, when the user depresses the camera's release button, latch 42 releases carrier member 44 and the latter changes the settings of changeover switches 21', 22' and 23', 24' from focussing operation to exposurecontrol operation, and shutter-release latch 49 causes exposure-objective aperture 41 to become unblocked and mode-control switch 36' to open to initiate an exposuretiming operation.

It will be understood that each of the elements described above, or two or more together, may also find a useful application in other types of constructions and circuitry differing from the types described above.

While the invention has been illustrated and described as embodied in a combined exposure-control and semiautomatic focussing system whose electrical components interact in particular ways with particular ones of the mechanical shutter and shutter-control components, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera, in combination, electronic exposure-control means having a light-dependent-signal input and operative for controlling exposure in dependence upon a light-dependent signal applied thereto; state-of-focus evaluating means comprising a photosensitive detector arrangement producing light-dependent-signals, and including at least one pair of photosensitive elements, and including an emitter emitting towards the subject to be photographed a beam of radiation having a predetermined frequency range within the frequency spectrum to which the photosensitive detector arrangement can respond, means controlling the incidence of light on the photosensitive detector arrangement in dependence upon changes in the camera's state of focus, including means for controlling, in dependence upon changes in the camera's state of focus, the relarive locations of the photosensitive detector arrangement, on the one hand, and of said beam of radiation as reflected back from the subject to be photographed, on the other hand, the means controlling the relative locations of the photosensitive detector and beam of radiation comprising means controlling the distribution of the reflected-back beam of radiation as between the two elements of the photosensitive-element pair, means receiving the light-dependent signals produced by the detector arrangement and deriving therefrom a stat-of-focus signal indicating the camera's state of focus, including subtracting means receiving and subtracting from each other the light-dependent signals produced by the two elements of the photosensitive-element pair, and supressing means operative for suppressing the effect of radiation not originating from said emitter upon the light-dependent signals produced by the photosensitive elements, including an optical filter located in front of the photosensitive elements and operative for transmitting thereto substantially only radiation of frequency within said predetermined frequency range, and means moving the optical filter out of the light path of the photosensitive elements during exposures controlled by the exposure-control means; and connecting means connecting the photosensitive detector arrangement of the state-of-focus evaluating means to the light-dependent-signal input of the exposure-control means for transmitting light-dependent signals to the latter from the former, so that the photosensitive detector arrangement be shared by both the exposure-control means and the state-of-focus evaluating means.

2. In a photographic camera, in combination, electronic exposure-control means having a light-dependent-signal input and operative for controlling exposure in dependence upon a light-dependent signal applied thereto; state-of-focus evaluating means comprising a photosensitive detector arrangement producing light-dependent-signals and including at least one pair of photosensitive elements, and an emitter emitting towards the subject to be photographed a beam of radiation having a predetermined frequency range within the frequency spectrum to which the photosensitive detector arrangement can respond, means controlling the incidence of light on the photosensitive detector arrangement in dependence upon changes in the camera's state of focus, including means for controlling, in dependence upon changes in the camera's state of focus, the relative locations of the photosensitive detector arrangement, on the one hand, and of said beam of radiation as reflected back from the subject to be photographed, on the other hand, the means controlling the relative locations of the photosensitive detector and beam of radiation comprising means controlling the distribution of the reflectedback beam of radiation as between the two elements of the photosensitive-element pair, means receiving the light-dependent signals produced by the detector arrangement and deriving therefrom a state-of-focus signal indicating the camera's state of focus, including subtracting means receiving and subtracting from each other the light-dependent signals produced by the two elements of the photosensitive-element pair, and suppressing means operative for suppressing the effect of radiation not originating from said emitter upon the light-dependent signals produced by the photosensitive elements, including an optical filter located in front of the photosensitive elements and operative for transmitting thereto substantially only radiation of frequency within said predetermined frequency range and a spot optics located in front of the photosensitive elements and operative for projecting onto them a small spot of light having a small field, and means operative for enlarging the field of light incident on the photosensitive elements during exposures controlled by the exposure-control means; and connecting means connecting the photosensitive detector arrangement of the state-of-focus evaluating means to the light-dependent-signal input of the exposure-control means for transmitting light-dependent signals to the latter from the former, so that the photosensitive detector arrangement be shared by both the exposure-control means and the state-of-focus evaluating means.

3. In a photographic camera as defined in claim 2, the connecting means comprising changeover switch means having a first setting connecting the photosensitive detector arrangement to the means deriving the state-of-focus signal and disconnecting the detector arrangement from the exposure-control means, and having a second setting diconnecting the photosensitive detector arrangement from the means deriving the state-of-focus signal and connecting the detector arrangement to the light-dependent-signal input of the exposure-control means.

4. In a photographic camera as defined in claim 2, the radiation emitted by the emitter being infrared, the optical filter transmitting onto the photosensitive elements substantially only infrared radiation.

5. In a photographic camera as defined in claim 2, the means enlarging the field of light comprising means operative for moving the spot optics out of the light path of the photosensitive elements.

6. In a photographic camera as defined in claim 2, furthermore including means moving the optical filter out of the light path of the photosensitive elements during exposures controlled by the exposure-control means.

7. In a photographic camera as defined in claim 6, the camera having an exposure objective having an optical axis, the means controlling the distribution of the reflected-back beam of radiation as between the two elements of the photosensitive-element pair comprising means operative, in dependence upon changes in the camera's state of focus, for shifting the spot optics in a direction transverse to the optical axis.

8. In a photographic camera as defined in claim 6, the camera having a user-activated camera release member, the connecting means comprising changeover switch means responsive to the release member and having a first setting connecting the photosensitive detector arrangement to the means deriving the state-of-focus signal and disconnecting the detector arrangement from the exposure-control means and assuming, in response to release member activation, a second setting disconnecting the photosensitive detector arrangement from the means deriving the state-of-focus signal and connecting the detector arrangement to the light-dependent-signal input of the exposure-control means.

9. In a photographic camera as defined in claim 8, the means moving the optical filter out of the light path of the photosensitive elements comprising a carrier member carrying the optical filter and means responding to user activation of the camera release member by moving the carrier member such that the filter is removed from the light path of the photosensitive elements, the carrier member being provided with a swtich-activating structure activating the changeover switch means and causing the latter to assume said second setting.

10. In a photographic camera as defined in claim 9, the spot optics and filter being a single structural unit.

11. In a photographic camera as defined in claim 9, the means operative for enlarging the field of light incident on the photosensitive elements during exposures controlled by the exposure-control means comprising auxiliary optics carried by the carrier member and moved by the latter into the light path of at least one of the photosensitive elements in response to user activation of the camera release member.

12. In a photographic camera as defined in claim 11, said auxiliary optics comprising spectral-response-correcting means operative for modifying the spectral content of light incident upon the photodetector arrangement during exposures controlled by the exposure-control means such as to compensate for the difference between the spectral response of the photodetector arrangement, on the one hand, and that of photographic film, on the other hand.

13. In a photographic camera as defined in claim 9, the camera including a shutter mechanism which comprises an aperture-unblocking member and an aperture-reblocking member, the carrier being constituted by the apertureunblocking member.

14. In a photographic camera as defined in claim 9, the means enlarging the field of light incident on the photosensitive elements during exposures controlled by the exposure-control means comprising means at least in part constituted by said carrier operative for moving the spot optics relative to the photosensitive elements in the direction of the optical axis of the spot optics.

15. In a photographic camera defined in claim 6, the radiation emitted by the emitter being infrared, the optical filter transmitting onto the photosensitive elements substantially only infrared radiation.

16. In a photographic camera as defined in claim 6, the camera comprising an exposure objective and a tubular housing mounting the exposure objective, both the emitter and the photodetector arrangement being located within the tubular housing.

17. In a photographic camera as defined in claim 6, the means enlarging the field of light incident on the photosensitive elements during exposures controlled by the exposure-control means comprising means moving the spot optics relative to the photosensitive elements in the direction of the optical axis of the spot optics.

* * * * *